Patented Mar. 6, 1923.

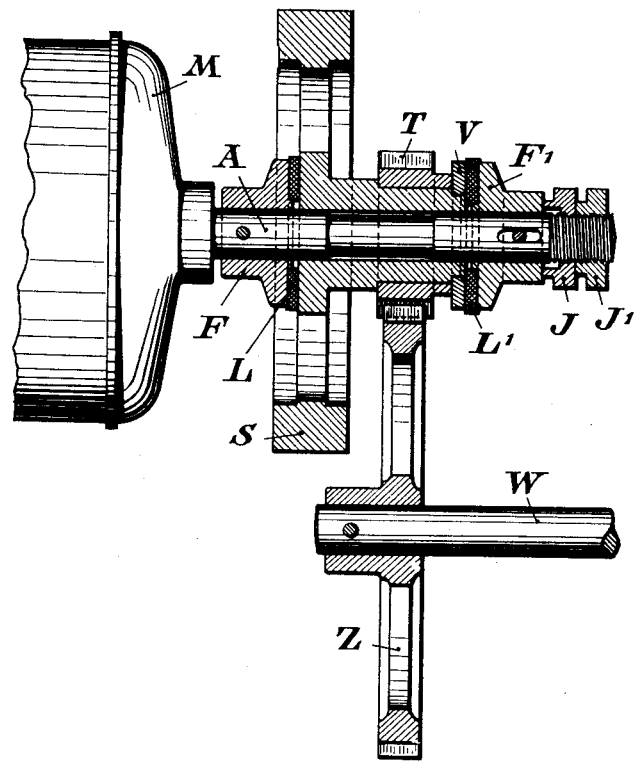

1,447,390

UNITED STATES PATENT OFFICE.

STANISLAUS KUCHARSKI, OF CHARLOTTENBURG, NEAR BERLIN, GERMANY.

CINEMATOGRAPH APPARATUS.

Application filed September 7, 1921. Serial No. 499,070.

*To all whom it may concern:*

Be it known that I, STANISLAUS KUCHARSKI, a citizen of Germany, residing at and whose post-office address is Charlottenburg, near Berlin, Dernburgstrasse 45, Germany, have invented certain new and useful Improvements in Cinematograph Apparatus (for which I have filed an application in Germany, bearing date of July 21st, 1920), of which the following is a specification.

The invention relates to cinematograph apparatus in which the film band, after it has been displayed, is automatically reeled up again so as to be ready for a fresh display. In apparatus of this kind, generally the direction of rotation of the motor is reversed, in order to alternately move the film band forward and then to wind it up again. As in apparatus of this description only very small motors are concerned, in which no resistance starters are employed, reversing takes place all at once, so that the other mechanism cannot follow suit promptly, and breakdowns will occur. According to the present invention this drawback is overcome in that upon the spindle of the driving motor or upon an intermediate spindle a weight is arranged freely rotatable, which is taken along by friction, and the driving of the apparatus is effected by this centrifugal weight. If a change of speed of the motor takes place such change will not act all of a sudden, but in a moderate way.

A section view of an embodiment of the invention is shown in the accompanying drawing.

M designates the motor, A its spindle, S a flying wheel, loosely disposed upon the spindle, upon which is secured by means of a pin the friction disc F. Between the spindle and the friction disc F' which latter is mounted on the axle A somewhat slidably but not turnable, the balance wheel S is provided. Tightly secured to the nave of said fly-wheel are the friction disc V and the little toothed wheel T which transmits the rotations of the motor through the toothed wheel and the shaft W to the apparatus. Between the friction discs F' and V on the one part and the fly-wheel S and the disc F on the other part, discs L and L' of leather or any other suitable material are interposed. By means of the adjusting nuts J, J' the friction disc F' is continuously forced against the disc V under moderate pressure, and by the same pressure the fly-wheel S is pressed against the friction disc F. The pressure can be varied by means of the adjusting nuts J, J'.

Suppose the motor is started, the spindle A is driven almost suddenly with full speed but the fly-wheel S in consequence of the momentum of inertia of the weight will attain full speed after a certain time, just according to the adjustment of the nuts J, J'. When shifting the direction of rotation of the spindle A is reversed and this will take place almost suddenly at full speed; but the fly-wheel S cannot be stopped and reversed suddenly. On the contrary it will gradually come at rest, in order to take after that the other direction and will attain full speed not before some time has elapsed. On account of such gradual starting and stopping (or reversing respectively) the breakdowns referred to in the premises are avoided.

I claim:

1. In cineomatograph apparatus the combination with the driven shaft and motor shaft, of a fly wheel rotatably mounted on the motor shaft, a spur gear connection between the fly wheel and the driven shaft, and a friction clutch connection between the fly wheel and the motor shaft for preventing abrupt starting and stopping of the driven shaft.

2. In cineomatograph apparatus the combination with the driven shaft and motor shaft, of a fly wheel rotatably mounted on the motor shaft, a spur gear connection between the fly wheel and the driven shaft, and a friction clutch connection between the fly wheel and the motor shaft for preventing abrupt starting and stopping of the driven shaft, said clutch connection comprising a clutch member fixed to the motor shaft at one face of the fly wheel, a member movable on the shaft and rotatable therewith at the opposite face of the fly wheel, and means for pressing the last named member and the fly wheel toward the first named member.

3. In cineomatograph apparatus the combination with the driven shaft and motor shaft, of a fly wheel rotatably mounted on the motor shaft, a spur gear connection between the fly wheel and the driven shaft, and a friction clutch connection between the fly wheel and the motor shaft for preventing abrupt starting and stopping of the driven shaft, said clutch connection comprising a clutch member fixed to the motor shaft at one face of the fly wheel, a member movable on the shaft and rotatable therewith at the opposite face of the fly wheel, and means for pressing the last named member and the fly wheel toward the first named member, said pressing means comprising nuts threaded on to the motor shaft and engaging the last named friction member.

In testimony whereof I have affixed signature in presence of two witnesses.

STANISLAUS KUCHARSKI.

Witnesses:
AHONY HANS SWEANEY,
GUSTAV PICTUH.